(12) United States Patent
White et al.

(10) Patent No.: US 7,243,685 B2
(45) Date of Patent: Jul. 17, 2007

(54) HIGH PRESSURE CLOSURE

(75) Inventors: Billy W. White, Spring, TX (US); Lawrence F. Angelo, Conroe, TX (US); Michael J. Guidry, Jr., Hockley, TX (US)

(73) Assignee: Robbins & Myers Energy Systems, L.P., Willis, TX (US)

( * ) Notice: Subject to any disclaimer, the term of this patent is extended or adjusted under 35 U.S.C. 154(b) by 484 days.

(21) Appl. No.: 10/839,076

(22) Filed: May 5, 2004

(65) Prior Publication Data

US 2005/0247711 A1 Nov. 10, 2005

(51) Int. Cl.
*F16L 55/10* (2006.01)

(52) U.S. Cl. .................... 138/89; 220/315; 220/288

(58) Field of Classification Search ................ 220/319, 220/315, 259.3, 260, 262, 235, 281, 298, 220/288; 215/276; 138/89
See application file for complete search history.

(56) References Cited

U.S. PATENT DOCUMENTS

| | | | | |
|---|---|---|---|---|
| 2,010,200 | A | * | 8/1935 | Rufener et al. ............. 220/246 |
| 2,396,469 | A | | 3/1946 | Meigs |
| 2,870,934 | A | * | 1/1959 | Hill ............................. 220/263 |
| 2,877,921 | A | | 3/1959 | Grim |
| 3,157,203 | A | * | 11/1964 | Ver Nooy .................... 138/89 |
| 3,667,647 | A | | 6/1972 | Van Daalen |
| 4,036,252 | A | * | 7/1977 | Wheatley .................. 137/527.8 |
| 4,237,936 | A | * | 12/1980 | Lollis et al. .................. 138/90 |
| 4,576,778 | A | * | 3/1986 | Ferree et al. ............... 376/203 |
| 5,799,560 | A | * | 9/1998 | Meng .......................... 91/404 |
| 5,975,142 | A | * | 11/1999 | Wilson ......................... 138/89 |
| 6,125,888 | A | | 10/2000 | Popov |
| 6,286,553 | B1 | * | 9/2001 | Morgan ....................... 138/89 |
| 6,663,149 | B1 | * | 12/2003 | White ..................... 292/256.5 |
| 6,685,380 | B2 | * | 2/2004 | White et al. ............. 403/322.4 |
| 6,769,152 | B1 | * | 8/2004 | Crenshaw et al. ...... 15/104.062 |
| 6,786,670 | B2 | * | 9/2004 | Smith ........................ 403/323 |
| 2003/0081992 | A1 | * | 5/2003 | White et al. ................ 403/299 |
| 2005/0247711 | A1 | * | 11/2005 | White et al. ................ 220/315 |

FOREIGN PATENT DOCUMENTS

| | | |
|---|---|---|
| EP | 0 129 349 | 5/1984 |
| GB | 130001 | 3/1920 |
| GB | 2 132 956 A | 12/1982 |

* cited by examiner

*Primary Examiner*—Anthony Stashick
*Assistant Examiner*—Christopher McKinley
(74) *Attorney, Agent, or Firm*—Browning Bushman P.C.

(57) ABSTRACT

A closure includes a hub having a bore in fluid communication with the port of a vessel. A door is removably positioned within the bore of the hub, and a locking ring is threaded with the hub thread for moving the door to a closed and circumferentially sealed position against the shoulder. At least one rotatable actuator element, such as a plurality of gears, engages the locking ring and is rotated to rotate the locking ring. A breaker bar or impact wrench could be used to rotatable drive the actuator elements.

29 Claims, 7 Drawing Sheets

HIGH PRESSURE CLOSURE

FIELD OF THE INVENTION

This invention relates to vessel or pipeline closures, which selectively enclose and seal an interior portion of a pressure containing vessel or pipeline. More particularly, this invention relates to closures of the type used on pipeline pig launching and receiving systems, and closures on access portals for pressurized vessels.

BACKGROUND OF THE INVENTION

A closure selectively closes an access port on a pressure-containing vessel, providing access to its interior. One of the more frequent applications for a closure is on pipelines to launch and retrieve a "pig," which is a device used in cleaning and inspecting pipelines. Historically most operations have used a working pressure below 5000 psi. Recently, sectors of the petroleum industry are requiring the use of higher pressure closures.

Closure designs commonly fall into one of three groups: threaded style, clamp style, or flat door. Each style has 3 basic parts: 1) a hub section permanently and sealingly secured to the vessel or pipeline, 2) a door which provides a seal against the hub and 3) a door hinge or transport mechanism.

The threaded style closure can be cumbersome to operate. Threading a cap onto a hub increases in difficulty as the diameter increases. Even a modest size cap is commonly articulated to the hub by a crane or davit-type hinge arrangement. Corrosion on the threads or seal surfaces can make operation difficult or, in severe cases, impossible. Yet, threaded style closures are popular because they offer a simple and safe design, as demonstrated by the large number in actual field use. U.S. Pat. No. 6,685,380 discloses an example of a threaded type closure having a chain binder for rotating the closure to thread or unthread it. The chain binder is an alternative to conventional hammer lugs, which must be struck with a hammer to close the closure. U.S. Pat. No. 6,663,149 discloses another alternative to hammer lugs, wherein a tightening ear is used to apply a torque to the closure cap. U.S. Pat. Nos. 6,286,553 and 3,667,647, U.S. Patent Application 2004-004081-A1, GB 2132956, and European Specification 0129349 disclose variations of a flat door closure. The ASME has published a figure showing "Some Acceptable Types of Unstayed Flat Heads and Covers," which shows a diagram of a conceptual closure that includes a locking ring threadedly secured to a hub and structurally separate from a door. The flat door version offers the quickest access of the three types. Yet, its weight makes installation difficult and corrosion over long periods of time can inhibit operation. Elaborate sealing techniques are also required. The flat door is usually secured to the hub with a self hinging or lifting arrangement.

The clamp style closure functions by bringing two flanges together and then securing their position with an external annular locking ring arrangement. Commonly, the annular lock ring is presented in two segments which may be held together via a bolting arrangement. While the concept is simple, the closure is heavy, and difficult to operate and seal. Not only does the door require some handling/articulation to the permanent portion of the closure, but the locking ring itself poses handling difficulties. Some type of powered drive is commonly required to secure such a device. One major inhibition is that the presence of pressure is not obvious to the operator. Cases of catastrophic failure and doors being opened under operating pressure have resulted in death and injury. A clamp style closure is disclosed in U.S. Pat. No. 6,125,888.

Although a number of different closures are in use, few of them, if any, are designed for operation at higher pressure levels more frequently demanded by the petroleum industry. A higher pressure and increasingly reliable closure is therefore desirable.

SUMMARY OF THE INVENTION

According to a preferred embodiment, a closure and method are disclosed for sealingly enclose a port in a vessel. A hub has a bore that defines a hub central axis and is in fluid communication with the port. A hub thread is secured to the hub, generally centered about the hub central axis. A proximate end is sealed to the vessel about the port, with a distal end of the hub axially opposite the proximate end. A door is movable within the bore of the hub and may be loosely positioned within the bore. A shoulder is provided within the hub for seating with the door, and a seal circumferentially seals between the door and the hub when the door is seated with the shoulder. A locking ring has a ring central axis and a ring thread generally centered about the ring central axis. The ring thread is thereby engageable with the hub thread and rotatable relative to and axially engageable with the door for moving the door to a closed position against the shoulder upon rotation of the locking ring about the ring central axis. At least one rotatable actuator element, which may be a gear or rotatable friction element, engages the locking ring and has an axis of rotation spaced from the ring central axis, such that rotation of the actuator element rotates the locking ring.

In some embodiments, a plurality of teeth may be circumferentially arranged about the ring central axis, and the at least one rotatable actuator element comprises at least one gear for engaging the plurality of teeth and rotating the locking ring. In other embodiments, a friction surface is circumferentially arranged about the ring central axis, and the rotatable actuator element comprises a friction element for frictionally engaging the friction surface of the ring, such that rotation of the friction element rotates the locking ring.

The gears, friction elements, or other rotatable actuator elements are preferably positioned radially inward of an inwardly facing surface of the locking ring, and rotatably secured to the door. A socket member may be secured to the at least one rotatable actuator element for receiving torque and transferring it to the at least one rotatable actuator element. A movable mounting arm may be provided for securing the door to the hub, for selectively moving the door into or out of the hub.

According to a preferred method, a hub is provided having a bore that defines a hub central axis, a hub thread secured to the hub and generally centered about the hub central axis, a proximate end, a distal end axially opposite the proximate end, and a shoulder within the hub for seating with the door. The proximate end of the hub is sealed to the vessel about the port such that the bore is in fluid communication with the port. The door is removably positioned within the bore. A shoulder is provided within the bore for seating with the door. A locking ring having a ring central axis and a ring thread generally centered about the ring central axis is engaged with the hub thread. At least one rotatable actuator element is engaged with the locking ring, with an axis of rotation of the actuator element spaced from the ring central axis. The actuator element is rotated to rotate the locking ring about the ring central axis to axially engage the door and move the door to a closed position against the shoulder. The door and the hub are circumferentially sealed when the door is seated with the shoulder.

A friction coating may be applied to some moving parts in some embodiments to reduce friction.

The foregoing is intended to give a general idea of the invention, and is not intended to fully define nor limit the invention. The invention will be more fully understood and better appreciated by reference to the following description and drawings.

DETAILED DESCRIPTION OF THE PREFERRED EMBODIMENTS

Figure 1:
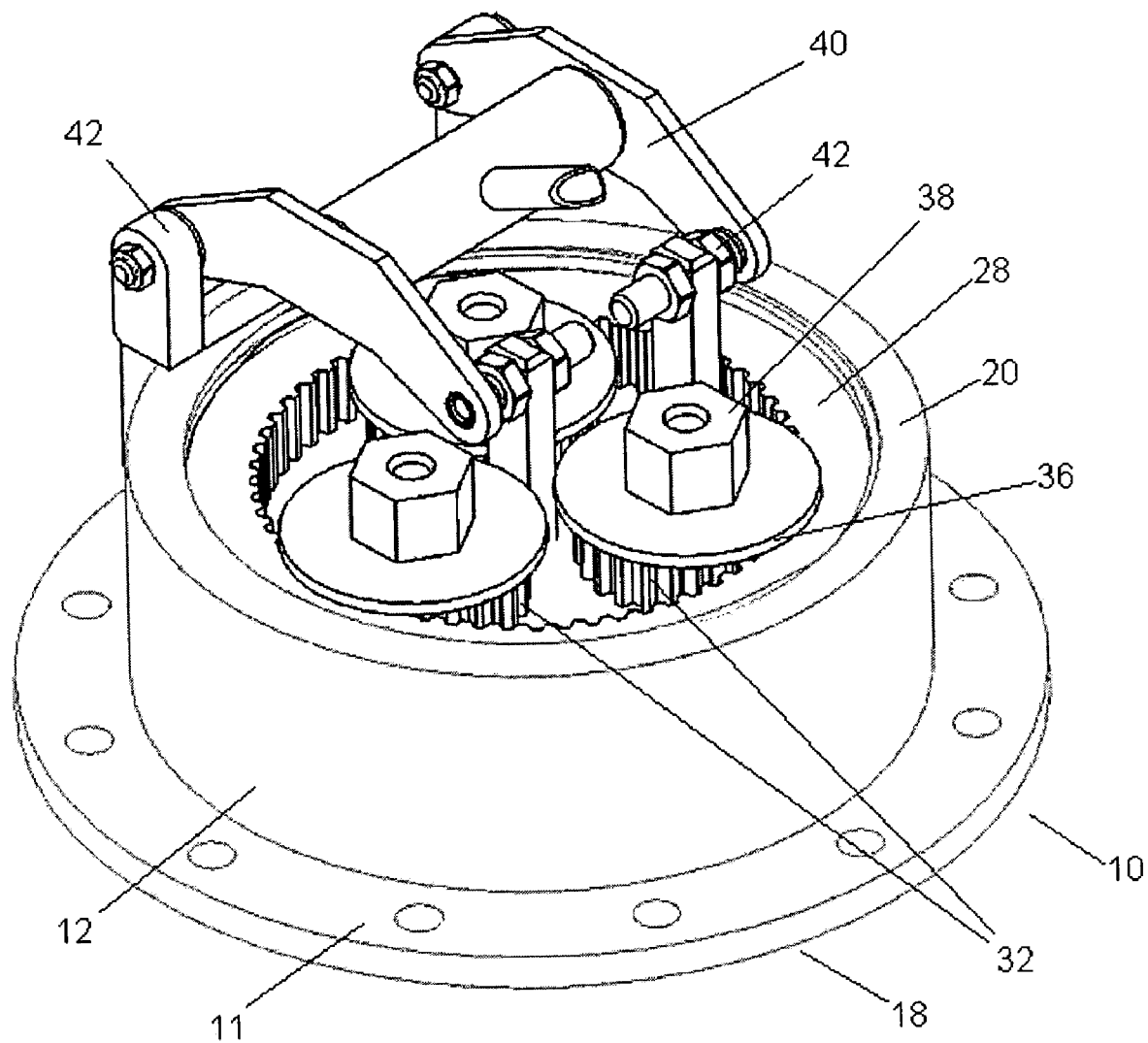
FIG. 1 shows a preferred embodiment of a closure wherein the ring has a male thread threadedly engaged with a female thread of the hub, with a plurality of gears secured to the door for rotating the threaded ring.
Figure 2:
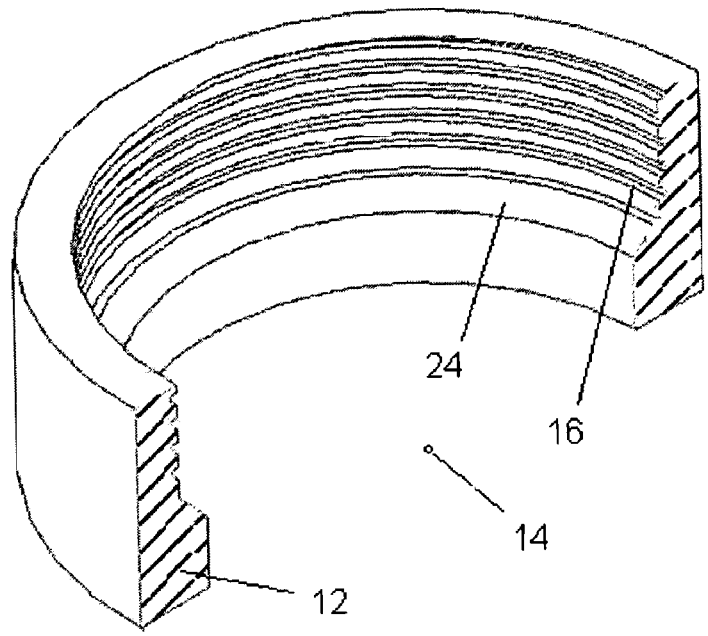
FIG. 2 shows a section view of the hub of FIG. 1.
Figure 3:
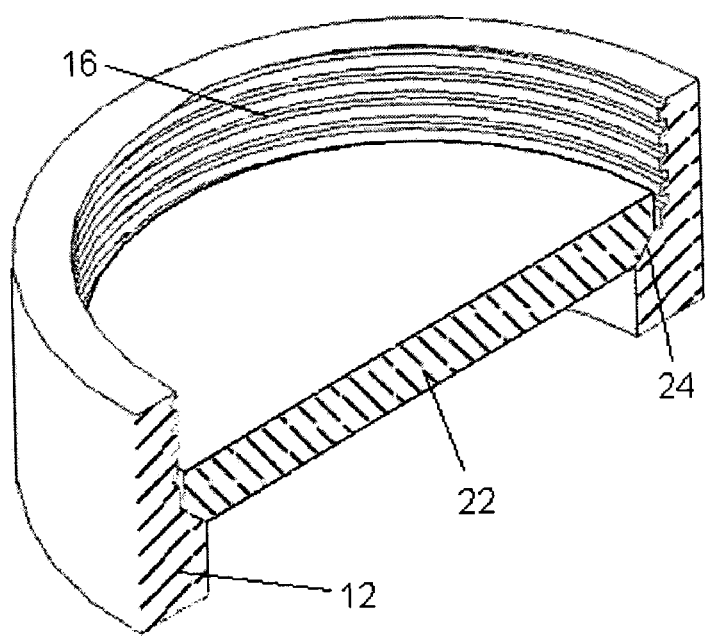
FIG. 3 shows a section view of the hub of FIG. 1 with the door seated against the shoulder.
Figure 10:
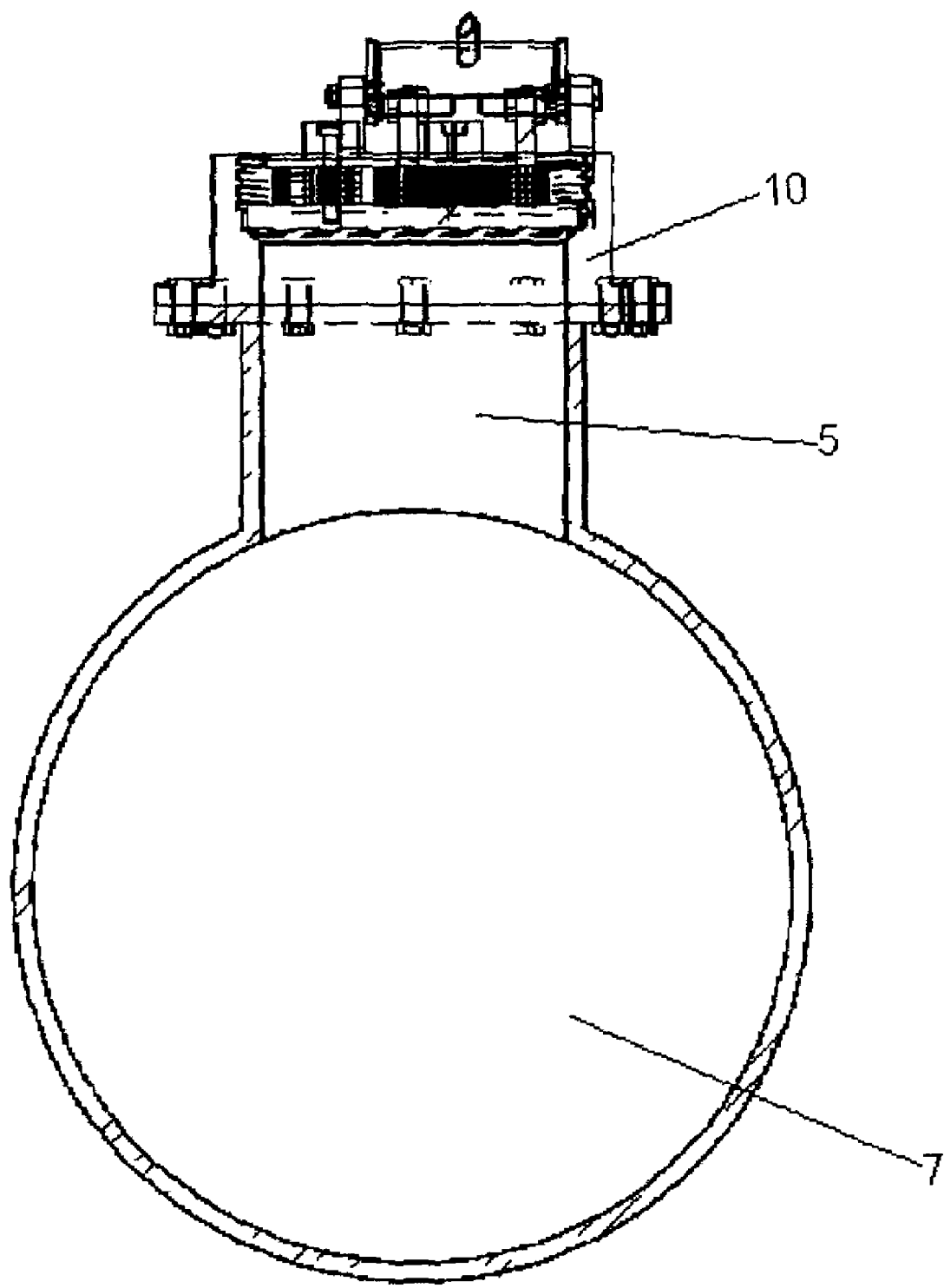
FIG. 10 shows a vessel to which the closure is secured.

FIG. 1 shows a preferred embodiment of a closure 10 to sealingly enclose a port 5 in a vessel 7 shown in FIG. 10. The vessel 7 may be a pipeline, a static pressure vessel, or other type of vessel. FIGS. 2–5 are cutaway views to show in more detail the various components of the closure 10 in various degrees of assembly. A hub 12 has a bore 14 that defines a hub central axis and is in fluid communication with the port 5. The hub 12 has a flange 11 for bolting the hub 12 to the port 5, but in other embodiments the hub 12 could be welded or otherwise secured and sealed to the vessel 7. A hub thread 16 is secured to the hub. 12 and is generally centered about the hub central axis. A proximate end 18 is provided for sealing to the vessel 7 about the port 5, and a distal end 20 is axially opposite the proximate end 18.

A door 22 is movable within the bore of the hub 12. A shoulder 24 within the hub 12 seats with the door 22. FIGS. 1–4 show the door 22 seated directly against the shoulder 24, which could potentially provide metal-to-metal sealing between the door 22 and shoulder 24 when in a closed position as described below. More preferably, an elastomeric seal 26 as conceptually shown in FIG. 5 circumferentially seals between the door 22 and the shoulder 24 of the hub 12 when the door 22 is seated with the shoulder 24. The seal 26 could be one of a variety of types of seals known generally in the art, such as an o-ring, a lip seal, or a metal ring for metal-to-metal sealing. In still other embodiments, an o-ring or other type of seal could seal circumferentially between the door 22 and shoulder 24, without necessarily being positioned on the shoulder 24. The seals may be compression seals that either elastically or plastically deform under pressure. The seal may also be energized by pressure from the pressure vessel 7, such as with a lip seal having a generally u-shaped cross section that is open to pressure within the vessel for sealingly expanding the u-shape cross section. Elastomeric seals generally provide a more forgiving seal at lower pressure, while a metal seal is generally better adapted for high pressures that may destroy a soft polymeric compound.

Figure 4:
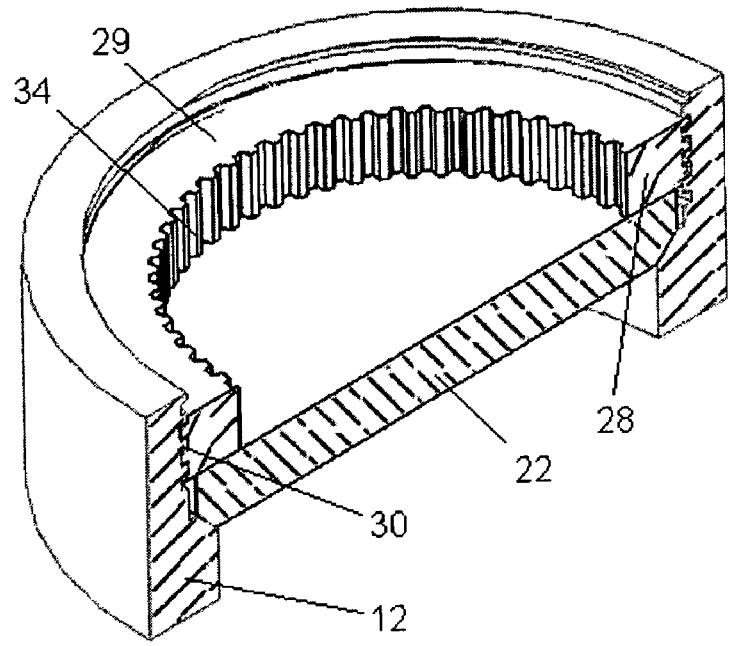
FIG. 4 shows a section view the ring threadedly engaged with the hub of FIG. 1 to seat the door against the shoulder.
Figure 5:
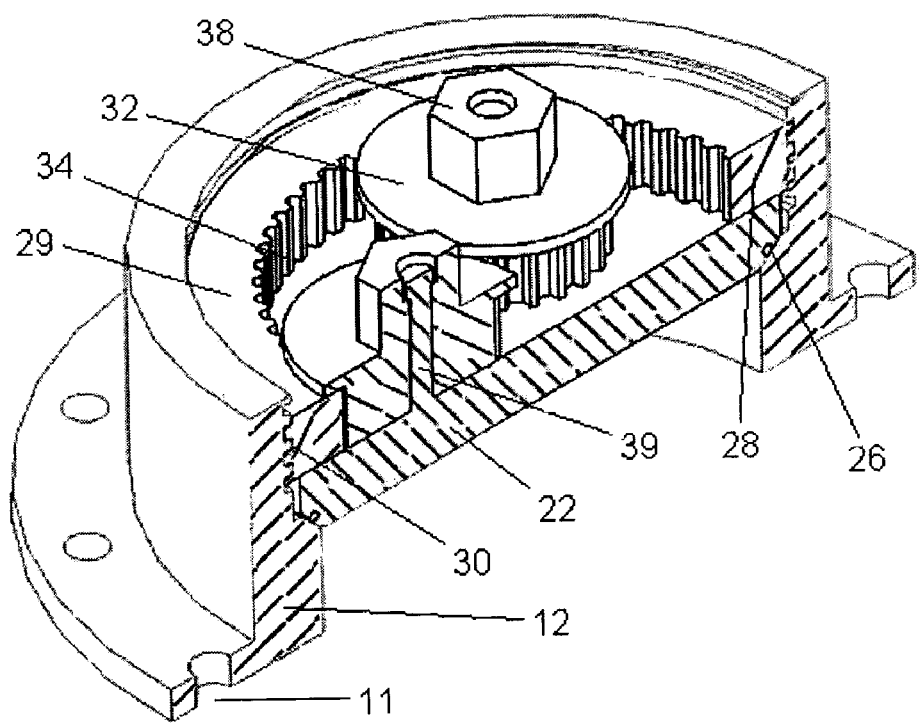
FIG. 5 shows a section view wherein a plurality of teeth are circumferentially arranged on the ring and a plurality of gears are engaged with the teeth.

A locking ring 28 having a ring central axis and a ring thread 30 generally centered about the ring central axis is engageable with the hub thread 16. The locking ring 28 is rotatable relative to and axially engageable with the door 22 for moving the door 22 to a closed position against the shoulder 24 upon rotation of the locking ring 28 about the ring central axis, as shown in FIGS. 4 and 5.

Figure 8:
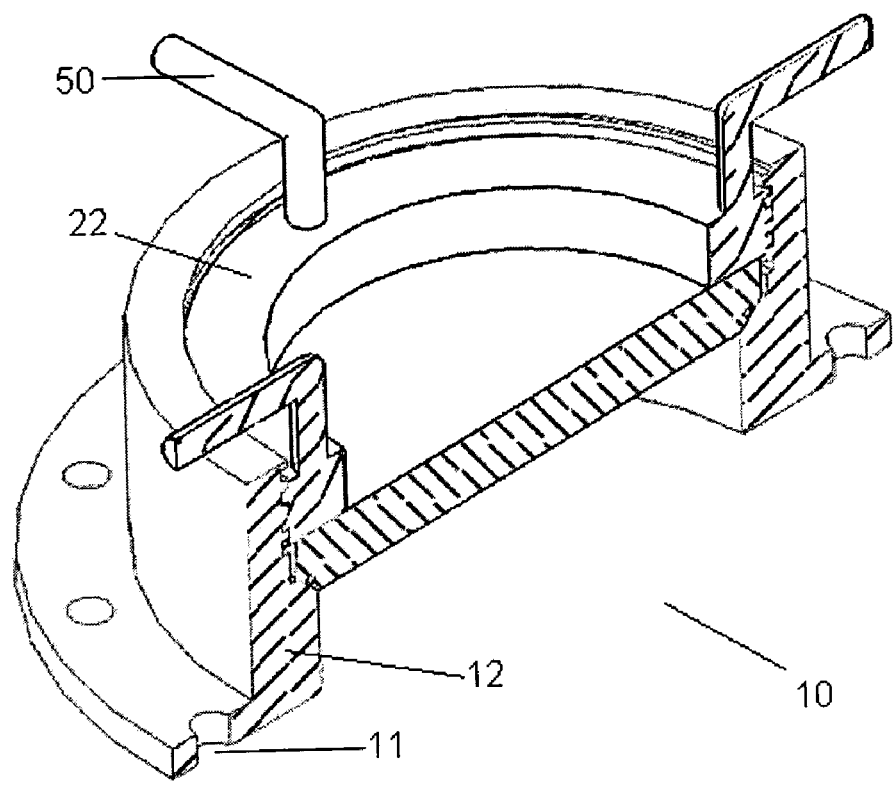
FIG. 8 shows an embodiment wherein handles are secured to the locking ring.

FIG. 8 illustrates another embodiment of the closure 10, whereby the ring 22 is manually rotated using handles 50. Although this may be suitable for smaller and/or lower pressure closures, it could be difficult to operate larger closures in this way. To reliably close the closure, the ring 22 may need to be turned more forcibly than is possible by hand. Factors such as high internal pressure, high sealing, forces, and parts corroded by time may increase the difficulty of rotating ring 22. A drive system is preferred that can be driven by a powered tool, or at least by a tool with more leverage than is provided by mere handles 50.

The closure 10 of FIGS. 1–5 is a preferred "gear drive" embodiment. A plurality of teeth 34 is circumferentially arranged about the ring central axis. At least one rotatable actuator element, which in this embodiment is three toothed gears 32, engages the teeth 34 of the locking ring 28 and has an axis of rotation spaced from the ring central axis such that rotation of the gear 32 rotates the locking ring 28.

Figure 9:
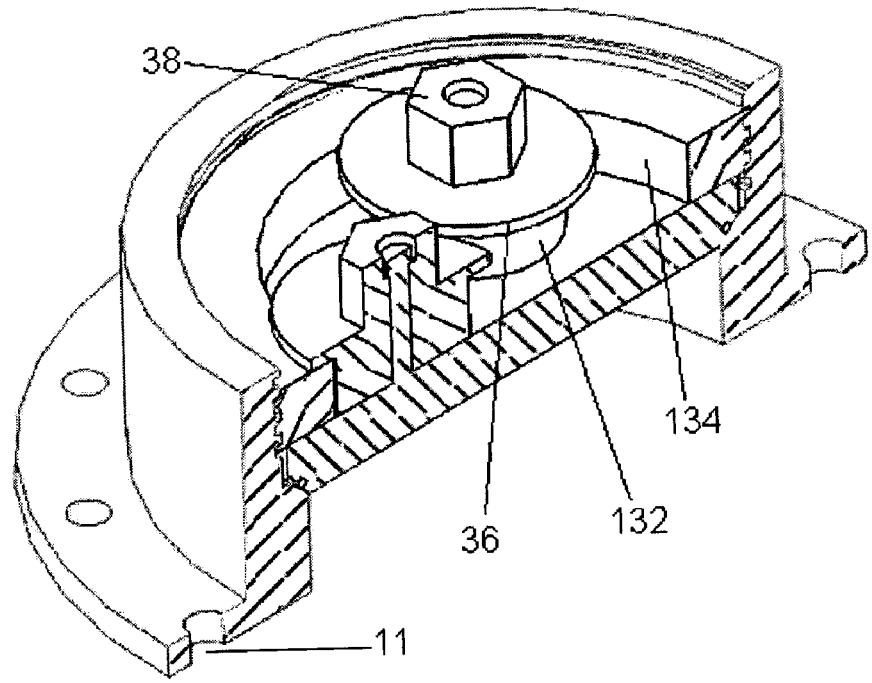
FIG. 9 shows an embodiment having a friction drive, rather than gears.

In an alternate "friction drive" embodiment shown in FIG. 9, a friction surface 134 is circumferentially arranged about the ring central axis. The rotatable actuator element instead comprises a plurality of friction elements 132, which resemble toothless "gears" for frictionally engaging the friction surface 134 of the ring 28. The friction surface 134 could be bare metal, but is preferably a rough or treated surface to increase the coefficient of friction between the friction surface 134 and friction elements 132. For example, the friction surface 134 could be knurled, impregnated with carbide or diamond grit, or coated with a higher-friction polymeric material. The friction elements 132 are preferably forcibly engaged with the friction surface 134 of the ring 28, to assure adequate friction force and prevent slippage between friction surface 134 and friction elements 132.

As shown in FIG. 1 (and similarly in FIG. 5), the toothed gears 32 are preferably positioned radially inward of an inwardly facing surface of the locking ring 28, which surface is defined by teeth 34 in FIG. 1. The gears 32 may be carried by one of the door 22 and the hub 12, and are preferably rotatably secured to the door 22, such as with mounting bolts 39, spindles, or other hardware. The mounting bolts 39 or other hardware used to mount the gears 32 should allow rotation of the gears 32, while constraining lateral movement of the gears 32. By being secured to the door 22, the gears 32 may be supported in firm engagement with the ring 28 to ensure reliable rotational engagement with minimal or no slippage. In the friction drive embodiment, a secure engagement between the friction elements 132 and the ring 28 is especially important. Furthermore, using a plurality of gears 32 as shown increases this support, by helping to stabilize the ring 28 by providing uniform outward force against the ring 28.

Figure 12:
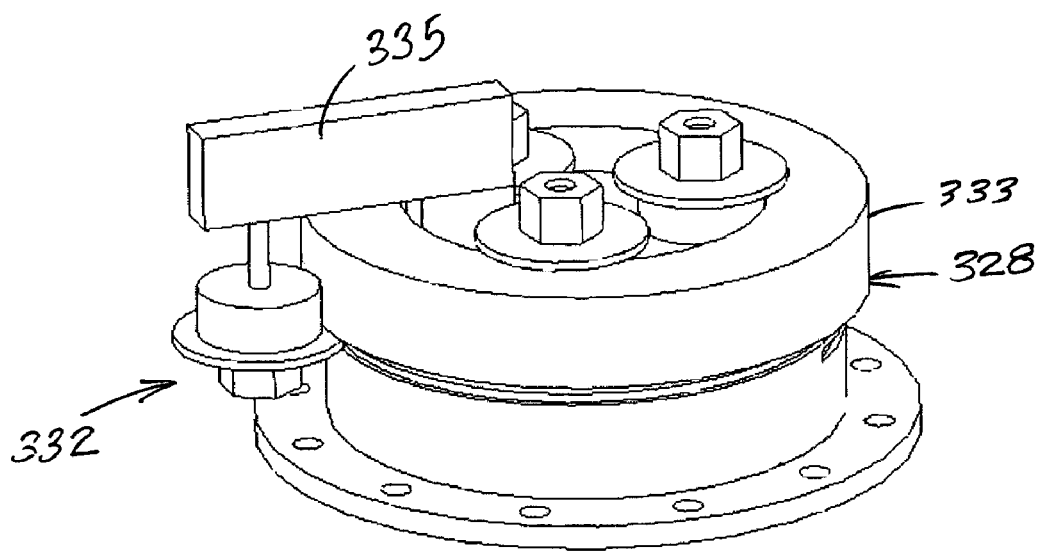
FIG. 12 shows an embodiment wherein one of the rotatable actuator elements is positioned radially outward of an outwardly facing surface of the locking ring.

Although the teeth 34 are positioned radially inwardly in some of the illustrated embodiments, some embodiments may include externally positioned ring teeth, with gears placed radially outwardly of the teeth. In FIG. 12, for example, one of the at least one rotatable actuator elements 332 is positioned radially outward of and in engagement with an outwardly facing surface 333 or teeth of the locking ring 328.

Figure 11:
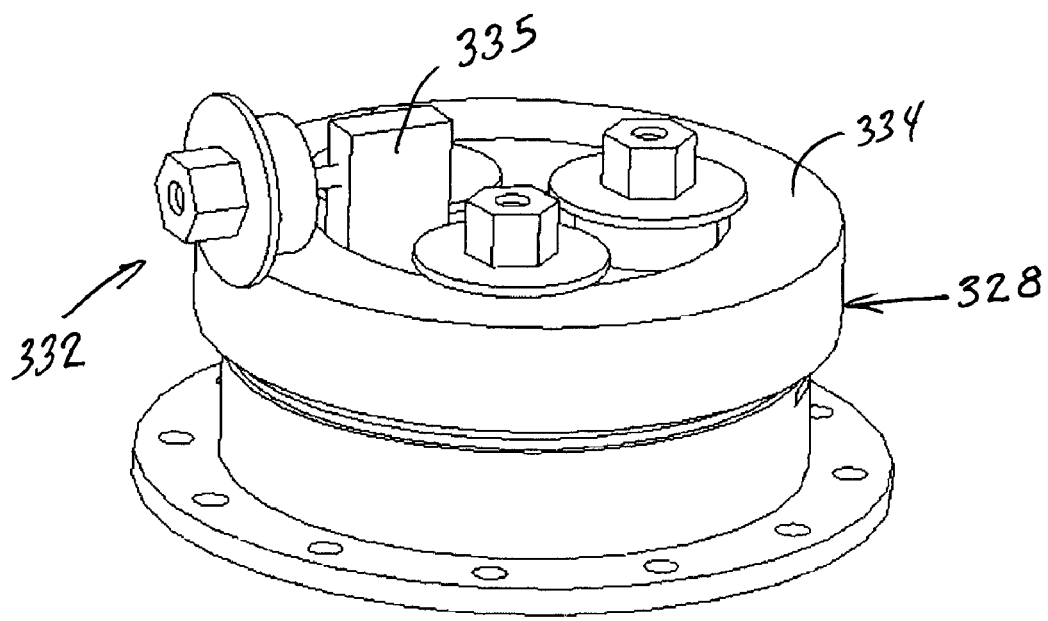
FIG. 11 shows an embodiment wherein the axis of rotation of one of the rotatable actuator elements is transverse to and substantially perpendicular to the ring central axis.

Furthermore, as shown in FIG. 11, the axis of rotation of one or more of the rotatable actuator elements 332 may spaced from and substantially parallel to the ring central axis. In FIG. 11, the actuator element 332 engages surface 334 or teeth. In such other embodiments, the rotatable actuator elements are secured with structure 335. Structure 335 is shown secured to the door, but may alternatively be secured to another part of the closure.

A socket member 38 is secured to the toothed gears 32 and to the rotatable friction elements 132. The socket member receives torque and transfers it to the gears 32 and friction elements 132. A breaker bar (not shown) could be fitted with a mating socket to turn the socket member 38. An impact wrench could also be used to drive the socket member 38, especially with larger, heavier closures.

As shown in FIG. 1, a movable mounting arm 40 secures the door 22 to the hub 12. The arm 40 may include one or more hinges 42, so that the door 22 may be selectively moved into or out of the hub 12. When the ring 28 is threaded onto the hub 12 and the door 22 is in the locking position, the threaded engagement between the ring 28 and hub 12 retains the ring 28 and door 22 to the closure 10. A retainer flange 36 is secured to the gears 32 (and friction elements 132 in FIG. 9) for engaging a distal end 29 of the locking ring 28 to retain the locking ring 28 in proximity to the door 22 when the closure 10 is subsequently opened. Because the gears 32 are rotatably secured to the door 22, the ring 28 is retained between the door 22 and the flanges 36. This is important for the convenience of operating the closure 10, especially with heavier closures, because it allows the door 22 and ring 28 to be hingeably swung into or out of position within the bore 14 via mounting arm 40.

Figure 6:
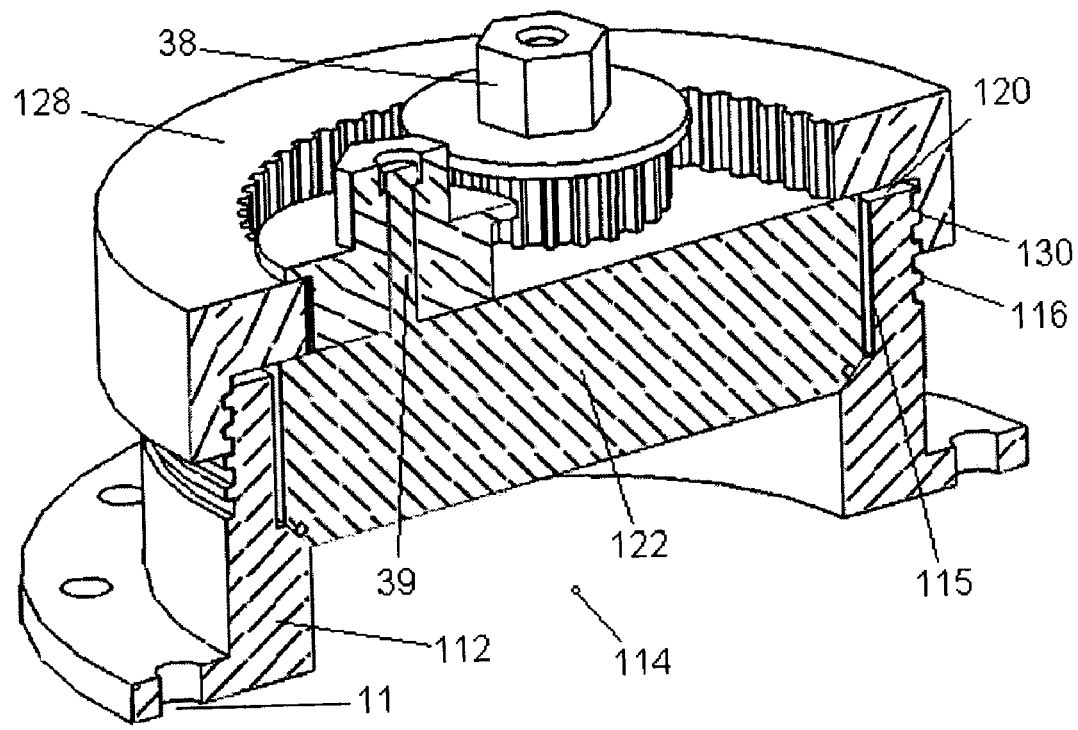
FIG. 6 shows a section view of another embodiment wherein the locking ring has a female thread engaged with a male thread of the hub, and wherein the door protrudes out of the hub when in the closed position.
Figure 7:
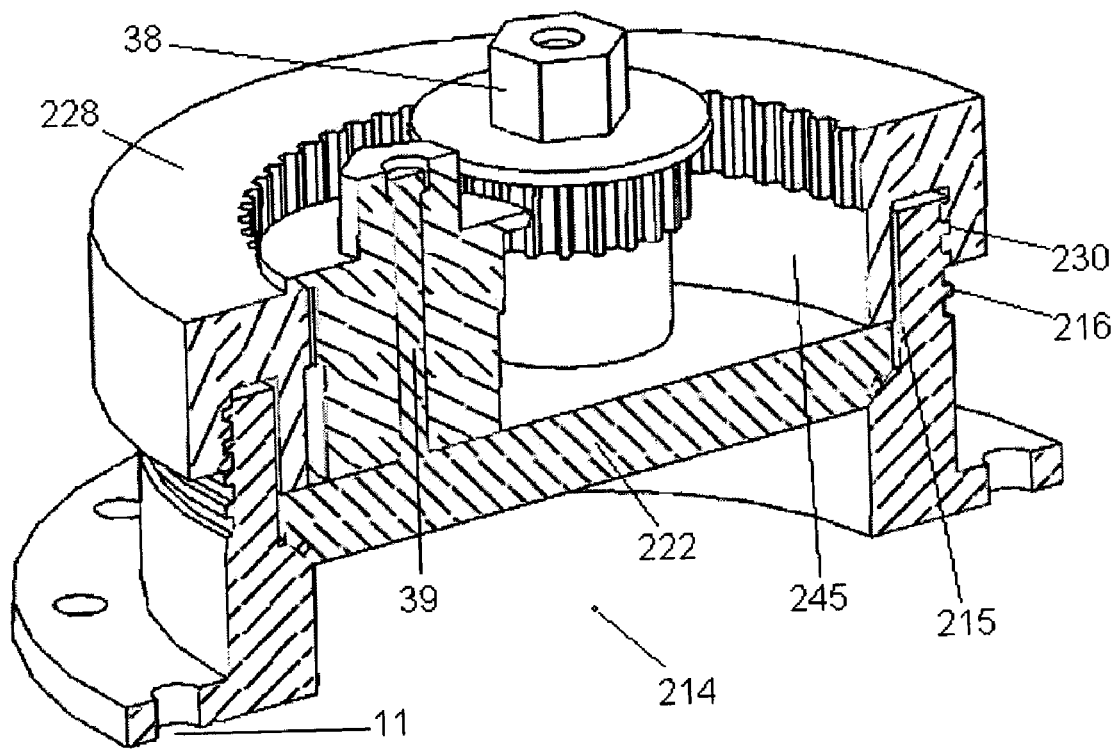
FIG. 7 shows a section view of another embodiment wherein the locking ring has a sleeve that protrudes into the bore and engages the door when the door is in the closed position.

In the FIG. 1 embodiment, the ring thread is a male thread 30 and the hub thread is a female thread 16. The entire locking ring 28 is positionable within the bore 14 of the hub 12 when the door 22 is in the closed position. By contrast, FIGS. 6 and 7 illustrate two modified embodiments of the closure 10, wherein the ring thread on rings 128, 228 is a female thread 130, 230 and the hub thread is a male thread 116, 216. In FIG. 6, the ring 128 extends radially inward of an inner wall 115, and the door 122 extends axially from the bore 114 past the distal end 120 of the hub 12 when the door 122 is in the closed position, such that the ring 128 engages the door 122 without extending into the bore 114. In FIG. 7, the ring 228 also extends radially inward of inner wall 215, but in contrast to the door 122 of FIG. 6, door 222 is positioned entirely within the bore 214, and a sleeve 245 secured to the ring 228 radially inwardly of inner wall 215 extends into the bore 214 to move the door 222 to the closed position.

The doors 22, 122, 222 are shown as flat, circular plates. In practice, this is a reliable door design that allows for simplicity of manufacture. For example, the circular plates may be cast, forged, or cut from circular bar stock. In practice, however, the door need not simply be a flat plate, so long as it can be circumferentially sealed with the hub and engaged by the ring. The door can instead have a more complex shape, such as a dome shape, or other shape that might be required for particular applications to fit with a particular hub. Typically, hubs such as hub 12 have a generally circular OD and bore 14, which can be manufactured from cylindrical tubing or piping and which mates well with a typically circular port 5.

Although friction may be advantageous between some parts in some embodiments, such as to provide frictional engagement between the friction surface 134 and frictional elements 132, a number of moving parts, such as gears 32 may benefit from a friction-reducing coating. The friction reducing coating may comprise any of a number of such materials known in the art. For example, a polymeric coating may be given to the gears 32, to reduce friction and increase efficiency of rotation.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations, and modifications, including but not limited to those design alternatives specifically discussed herein, may be made in the practice of the invention without departing from its scope.

The invention claimed is:

1. A closure to sealingly enclose a port in a vessel, comprising:
    a hub having a bore that defines a hub central axis for fluid communication with the port, a hub thread secured to the hub and generally centered about the hub central axis, a proximate end for sealing to the vessel about the port, and a distal end axially opposite the proximate end;
    a door movable within the bore of the hub;
    a shoulder within the hub for seating with the door;
    a seal circumferentially sealing between the door and the hub when the door is seated with the shoulder;
    a locking ring having a ring central axis and a ring thread generally centered about the ring central axis, the ring thread engageable with the hub thread, the locking ring rotatable relative to and axially engageable with the door for moving the door to a closed position against the shoulder upon rotation of the locking ring about the ring central axis; and
    at least one rotatable actuator element engaging the locking ring and rotatable about an axis of rotation spaced from the ring central axis such that rotation of the actuator element rotates the locking ring.

2. A closure as defined in claim 1, further comprising:
    a plurality of teeth circumferentially arranged about the ring central axis; and
    the at least one rotatable actuator element comprises at least one gear for engaging the plurality of teeth and rotating the locking ring upon rotation of the at least one gear.

3. A closure as defined in claim 1, further comprising:
   a friction surface circumferentially arranged about the ring central axis; and
   the rotatable actuator element comprises a friction element for frictionally engaging the friction surface of the ring.

4. A closure as defined in claim 1, wherein one or more of the at least one rotatable actuator element is positioned radially inward of an inwardly facing surface of the locking ring, and is rotatably secured to the door.

5. A closure as defined in claim 1, wherein one or more of the at least one rotatable actuator element is positioned radially outward of an outwardly facing surface of the locking ring.

6. A closure as defined in claim 1, wherein the axis of rotation of one or more of the rotatable actuator elements is substantially parallel to the ring central axis.

7. A closure as defined in claim 1, further comprising:
   a socket member secured to the at least one rotatable actuator element for receiving torque and transferring it to the at least one rotatable actuator element.

8. A closure as defined in claim 1, further comprising:
   a movable mounting arm securing the door to the hub, for selectively moving the door into or out of the hub.

9. A closure as defined in claim 1, wherein the ring thread is a male thread and the hub thread is a female thread.

10. A closure as defined in claim 9, wherein the entire locking ring is positioned within the bore of the hub when the door is in the closed position.

11. A closure as defined in claim 1, wherein the ring thread is a female thread and the hub thread is a male thread.

12. A closure as defined in claim 11, further comprising:
    the door extending axially from the bore past the distal end of the hub when the door is in the closed position, such that the ring engages the door without extending into the bore.

13. A closure as defined in claim 11, further comprising:
    a sleeve secured to the ring radially inwardly of an inner wall of the hub, the sleeve extending into the bore to move the door to the closed position.

14. A closure as defined in claim 1, wherein the seal comprises:
    an o-ring or a lip seal positioned between the door and the shoulder.

15. A closure as defined in claim 1, wherein the seal forms a metal-to-metal seal between the door and the shoulder.

16. A closure as defined in claim 1, wherein the at least one rotatable actuator element is carried by one of the door and the hub.

17. A closure as defined in claim 1, wherein the at least one actuator element comprises:
    a plurality of actuator elements, each engaging the locking ring.

18. A closure as defined in claim 17, wherein each of the plurality of actuator elements further comprises:
    a retainer flange for engaging a distal end of the locking ring to retain the locking ring in proximity to the door.

19. A closure as defined in claim 17, wherein the at least one actuator element comprises:
    at least three actuator elements.

20. A closure to sealingly enclose a port in a vessel, comprising:
    a hub having a bore that defines a hub central axis for fluid communication with the port, a hub thread secured to the hub and generally centered about the hub central axis, a proximate end for sealing to the vessel about the port, and a distal end axially opposite the proximate end;
    a door movable within the bore of the hub;
    a shoulder within the hub for seating with the door;
    a seal circumferentially sealing between the door and the hub when the door is seated with the shoulder;
    a locking ring having a ring central axis and a ring thread generally centered about the ring central axis, the ring thread engageable with the hub thread, the locking ring rotatable relative to and axially engageable with the door for moving the door to a closed position against the shoulder upon rotation of the locking ring about the ring central axis;
    at least one rotatable actuator element engaging the locking ring and rotatable about an axis of rotation spaced from the ring central axis such that rotation of the actuator element rotates the locking ring; and
    a plurality of teeth circumferentially arranged about the ring central axis; and
    the at least one rotatable actuator element comprises at least one gear for engaging the plurality of teeth and rotating the locking ring upon rotation of the at least one gear.

21. A closure as defined in claim 20, wherein one or more of the at least one rotatable actuator element is positioned radially inward of an inwardly facing surface of the locking ring, and is rotatably secured to the door.

22. A closure as defined in claim 20, wherein one or more of the at least one rotatable actuator element is positioned radially outward of an outwardly facing surface of the locking ring.

23. A closure as defined in claim 20, wherein the axis of rotation of one or more of the rotatable actuator elements is substantially parallel to the ring central axis.

24. A closure as defined in claim 20, further comprising:
    a socket member secured to the at least one rotatable actuator element for receiving torque and transferring it to the at least one rotatable actuator element.

25. A closure as defined in claim 20, wherein the ring thread is a male thread and the hub thread is a female thread.

26. A closure as defined in claim 20, wherein the entire locking ring is positioned within the bore of the hub when the door is in the closed position.

27. A closure as defined in claim 20, wherein the seal comprises:
    an o-ring or a lip seal positioned between the door and the shoulder.

28. A closure as defined in claim 20, wherein the seal forms a metal-to-metal seal between the door and the shoulder.

29. A closure as defined in claim 20, wherein the at least one actuator element comprises:
    at least three actuator elements.

* * * * *